(12) United States Patent
Fisher et al.

(10) Patent No.: US 11,593,831 B2
(45) Date of Patent: *Feb. 28, 2023

(54) REDEEMING MULTIPLE REDEEMABLE CODES IN A SINGLE TRANSACTION

(71) Applicant: Apple Inc., Cupertino, CA (US)

(72) Inventors: Jarad M. Fisher, Millbrae, CA (US); Madhusudhan Vudali, Santa Clara, CA (US); Raghav Boinepalli, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 17/235,077

(22) Filed: Apr. 20, 2021

(65) Prior Publication Data

US 2021/0241308 A1 Aug. 5, 2021

Related U.S. Application Data

(63) Continuation of application No. 15/274,896, filed on Sep. 23, 2016, now Pat. No. 11,017,423.

(51) Int. Cl.
*G06Q 30/02* (2012.01)
*G06Q 30/0238* (2023.01)
*G06Q 30/0207* (2023.01)
*G06Q 30/0226* (2023.01)

(52) U.S. Cl.
CPC ..... *G06Q 30/0238* (2013.01); *G06Q 30/0226* (2013.01); *G06Q 30/0239* (2013.01)

(58) Field of Classification Search
CPC .......... G06Q 30/0239; G06Q 30/0226; G06Q 30/0238
See application file for complete search history.

(56) References Cited

U.S. PATENT DOCUMENTS

| 8,751,314 | B2 * | 6/2014 | Fisher | H04M 1/72445 |
| | | | | 235/382 |
| 9,443,248 | B2 * | 9/2016 | Shafi | G06Q 30/0207 |
| 10,609,026 | B2 * | 3/2020 | Han | H04W 12/086 |
| 2011/0082729 | A1 * | 4/2011 | Carvallo | G06Q 30/0211 |
| | | | | 705/14.38 |
| 2013/0325567 | A1 * | 12/2013 | Bradley | G06Q 30/02 |
| | | | | 705/14.1 |

(Continued)

*Primary Examiner* — Michael I Ezewoko
(74) *Attorney, Agent, or Firm* — Invoke

(57) ABSTRACT

The systems described herein include a system and method for redeeming multiple redeemable codes. For example, a mobile device can be configured to enable redemption of multiple redeemable codes in a single transaction. In some implementations, the mobile device can store the plurality of redeemable codes for obtaining discounts on the items obtained from the merchant store. Particular implementations provide at least the following advantages: A mobile device can store and manage multiple redeemable codes for a user. The mobile device can automatically select and provide the redeemable codes to a point of sale terminal when the user is making a purchase. The codes can be automatically selected and applied to the purchased goods or services to generate a discount for the user. Redeemable codes can be automatically removed from the user's device after they have been used. Thus, the user is relieved of the burden of managing redeemable codes.

17 Claims, 8 Drawing Sheets

(56) References Cited

U.S. PATENT DOCUMENTS

| | | | |
|---|---|---|---|
| 2014/0025470 A1* | 1/2014 | Berman | G06Q 30/0235 |
| | | | 705/14.26 |
| 2015/0149268 A1* | 5/2015 | Vienneau | G06Q 20/387 |
| | | | 705/14.23 |
| 2015/0193858 A1* | 7/2015 | Reed | G06Q 30/0633 |
| | | | 705/26.8 |

* cited by examiner

REDEEMING MULTIPLE REDEEMABLE CODES IN A SINGLE TRANSACTION

INCORPORATION BY REFERENCE; DISCLAIMER

The following application is hereby incorporated by reference: application Ser. No. 15/274,896 filed on Sep. 23, 2016. The Applicant hereby rescinds any disclaimer of claim scope in the parent application(s) or the prosecution history thereof and advises the USPTO that the claims in this application may be broader than any claim in the parent application(s).

TECHNICAL FIELD

The disclosure generally relates to mobile transactions for trans multiple redeemable codes information between electronic devices.

BACKGROUND

Redeemable codes (e.g., coupons, discounts, rebates, etc.) are issued by manufactures or retailers to be used in retail stores as a part of sales promotions. Those redeemable codes traditionally were attached to paper certificates or downloadable printouts. However, those paper and printout codes are cumbersome and are subject to wear out, lost, being misplaced or just not being available when a consumer would like to use them. For example, when the customer is trying to use paper and printout codes, the customer must collect all paper and printed codes, bring the codes to the retail store, and present the codes to a store clerk who applies the codes to purchased items to give the customer a discount. This process is not efficient and is often labor intensive. Also, paper and printout codes are particularly vulnerable to forgery. For example, the multiple copies of the paper and printout codes can be duplicated and used to obtain multiple discounts on purchased items. Thus, a more efficient mechanism for allowing a user to store and redeem multiple redeemable codes at any retail locations is needed.

SUMMARY

The systems described herein include a system and method for redeeming multiple redeemable codes. For example, a mobile device can be configured to enable redemption of multiple redeemable codes in a single transaction. In some implementations, the mobile device can store the plurality of redeemable codes for obtaining discounts on items the user of the mobile device has selected to purchase from the merchant store.

In some implementations, a mobile device can receive a request for purchase discount information from a merchant device (e.g., point-of-sale system (POS) terminal device). In response to receiving the request, the mobile device can automatically select a plurality of redeemable codes stored on the mobile device that are relevant to the corresponding merchant and send the codes to the merchant device. The merchant device can receive the redeemable codes and automatically select which codes to apply to a purchase transaction to provide a discount to the customer. The merchant device can send information describing the discounted purchase price for the items selected by the user and identifiers for each of the plurality of redeemable codes used for generating the discounted purchase price to the mobile device. The mobile device can then send the payment information for purchasing the selected items at the discounted price to the merchant device. In some implementations, the mobile device can compare the redeemable codes on the mobile device to the redeemable codes that the merchant device used to remove the applied redeemable codes from the mobile device.

Particular implementations provide at least the following advantages, which are not a required feature of any embodiment: A mobile device can store and manage multiple redeemable codes for a user. The mobile device can automatically select and provide the redeemable codes to a point of sale terminal when the user is making a purchase. The codes can be automatically selected and applied to the purchased goods or services to generate a discount for the user. Redeemable codes can be automatically removed from the user's device after they have been used. Thus, the user is relieved of the burden of managing redeemable codes.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Overview

Examples of a method, apparatus, and computer program for redeeming multiple redeemable codes in a single transaction are disclosed below. In the following description, for the purposes of providing explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
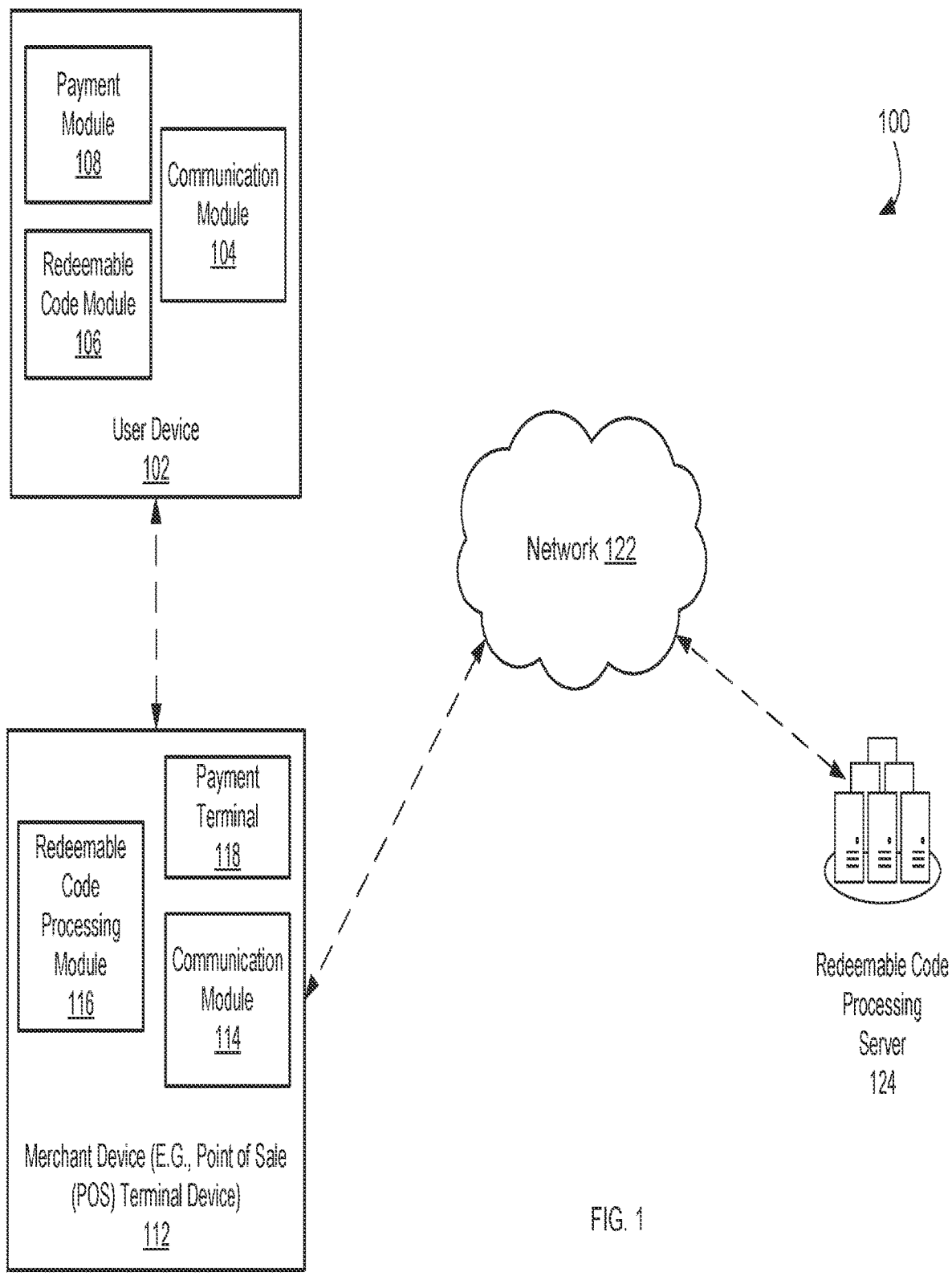
FIG. 1 is a block diagram of an example system for redeeming multiple redeemable codes in a single transaction.

FIG. 1 is a block diagram of an example system 100 for redeeming multiple redeemable codes in a single transaction. For example, system 100 can be configured to automatically redeem multiple redeemable codes in a single transaction. System 100 can, for example, automatically determine which redeemable codes are relevant to the merchant from which the user is making a purchase and automatically provide the redeemable codes to the merchant device.

For example, the user device may send all the redeemable codes on the user device to the merchant device. In some implementations, the merchant device may only use the portion of those redeemable codes matching the selected purchase items in the transaction. In some implementations, the merchant device may send a used code notification to the user device. In some implementations, the used code notification can include the used redeemable codes used by the merchant device in the transaction. In some implementations, in response to the used code notification, the user device can automatically remove the used redeemable codes from the user device. In some implementations, the user device can maintain the unused redeemable codes on the user device based on the used code notification.

In some implementations, the merchant device can automatically determine which redeemable codes are relevant to the items the user has selected to purchase and automatically discount the purchase price for the selected items based on the redeemable codes. For example, the merchant device can notify the user device of which redeemable codes were used when discounting the selected items so that the used redeemable codes can be automatically removed from the user's device. Additional details of system 100 are described below.

In some implementations, system 100 can include user device 102. For example, user device 102 can be a computing device, such as a smartphone, tablet computer, laptop computer, electronic book device, game device, smart watch, smart glasses and/or other mobile or wearable device, the accessories and peripherals of these devices, or any combination thereof.

In some implementations, user device 102 can include redeemable code module 106. For example, redeemable code module 106 can manage redeemable codes obtained by and/or stored on user device 102. For example, redeemable code module 106 can receive redeemable codes from paper advertisements, email, software applications, websites or QR codes presented on various media (e.g., paper, digital packaging, etc.). For example, while the user of user device 102 is viewing a webpage of a website, the user may select a link (e.g., from an advertisement) to download a redeemable code to user device 102. Similarly, the user may receive a link to a redeemable code in an email (e.g., an advertisement) and select the link to cause user device 102 to download the redeemable code. Alternatively, the user may use user device 102 to capture an image of a QR code (e.g., printed on a paper advertisement) that can be used to obtain a redeemable code from an online resource (e.g., a coupon server). For example, the QR code can include a URL that user device 102 can use to obtain the redeemable code from a network resource. Other mechanisms for obtaining redeemable codes can be used. For example, user device 102 can capture an image of a printed paper coupon and perform optical character recognition to obtain information (e.g., manufacturer identifier, product identifier, expiration date, discount amount, etc.) for generating a redeemable code from the printed coupon. After receiving the redeemable codes, redeemable code module 106 can store the redeemable codes in a redeemable code database on user device 102.

In some implementations, redeemable code module 106 can manage redeemable code data for each redeemable code managed by redeemable code module 106. For example, the redeemable code data may include redeemable code identifier to identify the particular code. The redeemable code data may include a discount amount (e.g., a percentage off the original price, a fixed discount amount, etc.). The redeemable code data may include a product identifier to identify the particular product to which the code may be applied. The redeemable code data may include merchant identifier to identify a merchant or merchants where the redeemable code can be redeemed or used to obtain a discount. The redeemable code data may include restrictions such as limiting the availability of the code only particular stores or in particular geographic areas. The redeemable codes data may include other descriptive information such as expiration date of the redeemable code.

In some implementations, user device 102 can include communication module 104. In particular, communication module 104 can be used to transmit and receive data from other devices by using, for example, short range communication protocols. For example, communication module 104 can be a hardware and/or software that implements various communication mechanisms and/or protocols, such as those related to a near field communication (NFC), Bluetooth, Bluetooth low energy, peer-to-peer Wi-Fi and/or optical communication technologies.

In some implementations, user device 102 can include payment module 108. For example, payment module 108 can manage payment processing on user device 102. For example, payment module 108 can authenticate the user of user device 102 to determine whether the user is authorized to make a payment or purchase using payment account information stored on user device 102. After authenticating the user, payment module 108 can obtain payment account information (e.g., credit card information, debit card information, checking account information, loyalty card information, user identifier, payment proxy token, etc.) from storage on user device 102 and provide the payment account information to the merchant from whom the purchase is being made.

In some implementations, system 100 can include merchant device 112. For example, merchant device 112 can be a computing device, such as a point-of-sale system (POS) terminal device. While merchant device 112 is represented as a single device in system 100, merchant device 112 can comprise multiple devices, such as a POS terminal for interfacing with a customer and a merchant server for processing purchase transactions using customer information received from the POS terminal.

In some implementations, merchant device 112 can include communication module 114. In particular, communication module 114 can be used to transmit and receive data from other devices by using, for example, short communication protocols. For example, communication module 114 can be a hardware and/or software that implements various communication mechanisms and/or protocols, such as those related to a near field communication (NFC), Bluetooth, Bluetooth low energy, peer-to-peer Wi-Fi and/or optical communication technologies.

In some implementations, merchant device 112 can include redeemable code processing module 116. For example, when merchant device 112 is configured to match redeemable codes to items that a user has selected to purchase, redeemable code processing module 116 can select which redeemable codes to apply to a purchase transaction to provide a discount to the customer. For example, redeemable code module 116 can compare the product identifier associated with a redeemable code (e.g., in the redeemable code data) to the product identifier of a selected item to determine whether the redeemable code can be applied to reduce the cost of the selected item. When the product identifier associated with the redeemable code matches the product identifier for a selected item, redeemable code module 116 can use the redeemable code to discount the purchase price of the selected item.

In some implementations, redeemable code processing module 116 can send transaction information to a redeemable code server for processing. For example, redeemable code processing module 116 can generate a transaction package that includes redeemable codes and descriptions of items selected for purchase by the user. For example, redeemable code processing module 116 may be configured to send transaction information (e.g., the transaction package) to a redeemable code processing server. The server can, for example, compare the redeemable codes in the transaction package to selected purchase items identified in the transaction package to determine which redeemable codes should be applied to which items to discount the cost of the selected items. Redeemable code processing module 116 can receive the discounted cost and identifiers for redeemable codes used to generate the discounted cost from the redeemable code processing server.

In some implementations, redeemable code processing module 116 can send redeemable codes to a redeemable code server for validation. For example, redeemable code processing module 116 may determine which redeemable codes to apply to items that the user has selected to purchase. However, before using the redeemable codes, module 116 can send the redeemable codes to a redeemable code processing server for validation. Redeemable code processing module 116 can, for example, receive information from the server indicating which of the redeemable codes are valid (or invalid). Redeemable code processing module 116 can then avoid using the invalid redeemable codes to discount the cost of items the user has selected to purchase. Redeemable code processing module 116 can send identifiers for the invalid redeemable codes to user device 102 so that the invalid redeemable codes can be deleted from user device 102.

In some implementations, merchant device 112 can include payment processing module 118. For example, payment processing module 118 can communicate with user device 102 to process payment for the selected items. For example, payment processing module 118 can receive information describing the discounted price of the items the user has selected to purchase and identify the redeemable codes used to generate the discounted price from redeemable code processing module 116. Payment processing module 118 can send the discounted price information and the used redeemable code identifiers to user device 102. Payment processing module 118 can receive payment data (e.g., default credit card information) from user device 102, payment processing module 118 can process payments for purchases initiated by the user.

In some implementations, system 100 can include redeemable code processing server 124. For example, redeemable code processing server 124 can receive the transaction package, described above, from merchant device 112 through network 122. Redeemable code processing server 124 can analyze the transaction package to determine which redeemable codes to apply to the items being purchased by the user. In some implementations, redeemable code processing server 124 can evaluate the validity and priority of the redeemable codes. After analyzing the transaction package and/or validity of the redeemable codes, redeemable code processing server 124 can send information to identify the discounted price of the items to be purchased, the redeemable codes used to generate the discounted price, and/or information describing the validity (or invalidity) of the redeemable codes to merchant device 112.

Figure 2:
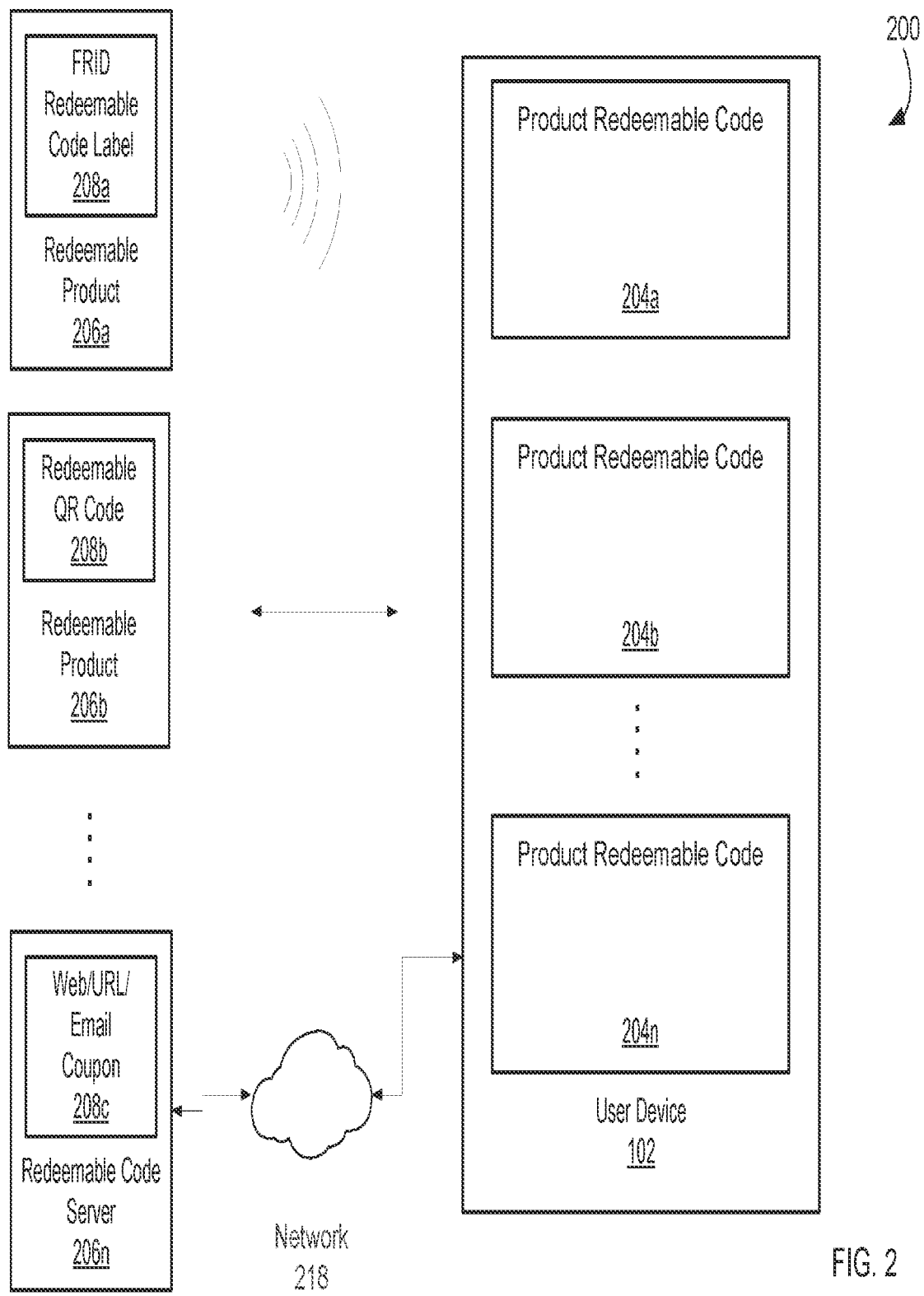
FIG. 2 is a block diagram of an example system for obtaining redeemable codes.

FIG. 2 is a block diagram of system 200 for obtaining redeemable codes. For example, system 200 can correspond to system 100 of FIG. 1. System 200 can, for example, obtain redeemable codes from different sources and store the redeemable codes on user device 102. Later, the redeemable codes can be used by system 200 to obtain discounts on items the user has selected to purchase.

In some implementations, system 200 can include user device 102. For example, user device 102 can obtain redeemable codes from paper advertisements, email, software applications, websites or QR codes presented on various media (e.g., paper, digital packaging, etc.) as described above. For example, user device 102 may obtain redeemable codes from radio frequency identification (RFID) label 208a of the product 206a by using electromagnetic fields. In some implementations, user device 102 can obtain redeemable codes by scanning the redeemable QR code 208b of the product 206b. For example, while the user of user device 102 is viewing a webpage of a website, the user may select a link to download a redeemable code to user device 102. Similarly, the user may receive a link to a redeemable code in an email 208c and select the link to cause user device 102 to download the redeemable code from redeemable code server 206n. Alternatively, the user may use user device 102 to capture an image of a QR code that can be used to obtain a redeemable code from an online resource (e.g., a coupon server). As described above, after receiving the redeemable codes, redeemable code module 106 can store the redeemable codes in a redeemable code database on user device 102.

Figure 3:
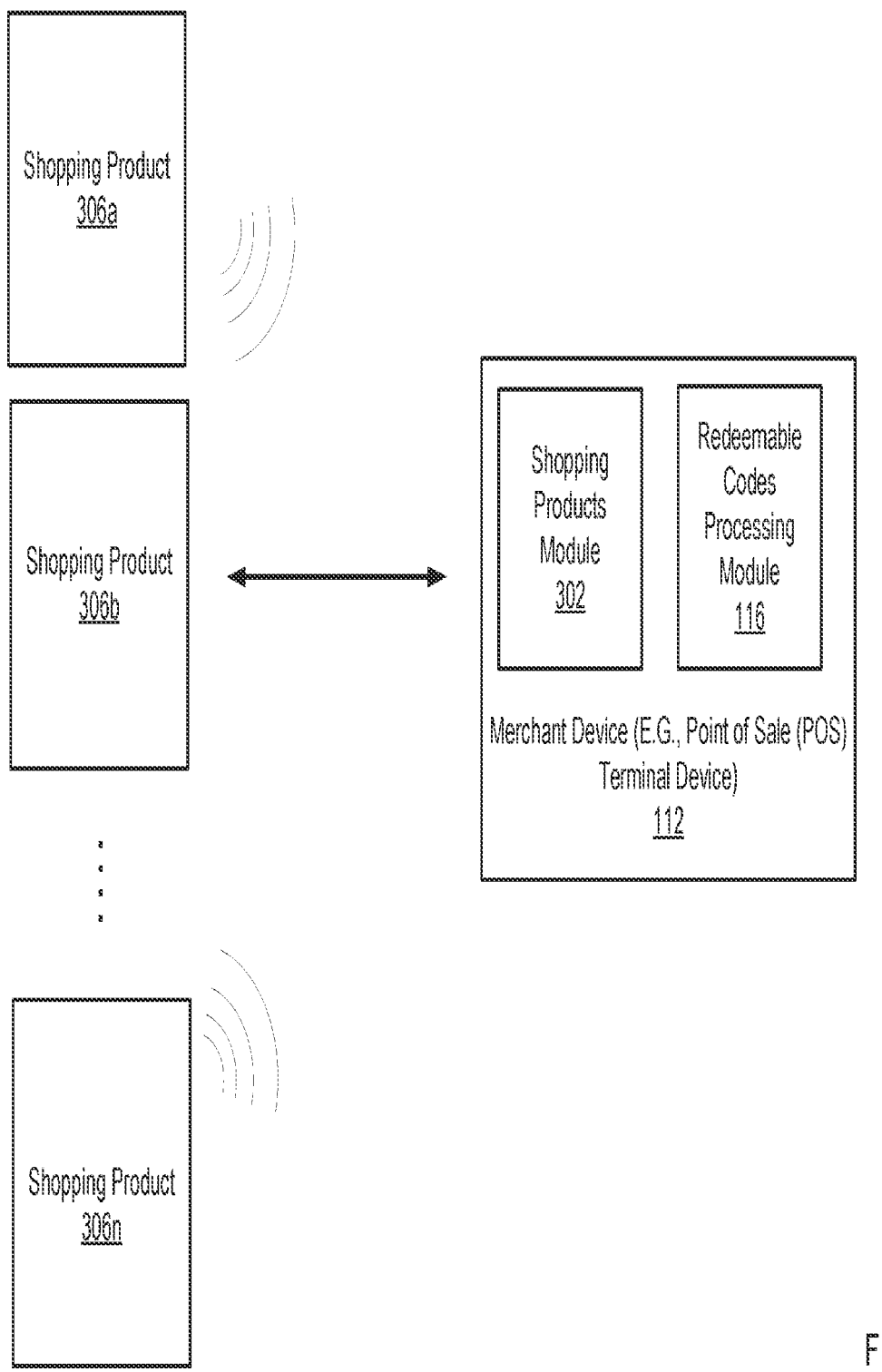
FIG. 3 is a block diagram of an example system for receiving shopping products information by the point of sale (POS) terminal device.

FIG. 3 is a block diagram of an example system 300 for receiving shopping products information by merchant device 112. For example, merchant device 112 can include a point of sale (POS) terminal located at a merchant store. A user of user device 102 can go to the merchant store and select items to purchase. For example, if the user visits a grocery store, the items can be food items added to the user's shopping cart as the user walks through the grocery store. If the user shops at a clothing store, the items can be clothing items that the user has picked up in the clothing store. When the user wishes to purchase the selected items (e.g. grocery items, clothing items, etc.), the user can take the items to a point of sale terminal where a store clerk (e.g., cashier) can enter the items (e.g., scan bar codes, scan QR codes, enter product identifiers, etc.) into merchant device 112 to obtain product information for each of the items.

In some implementations, merchant device 112 can include shopping products module 302. For example, shopping products module 302 can store product identifiers of scanned shopping products 306a-306n, the merchant identifier and/or product information. For example, the products information can include a merchant identifier, a product identifier of the item entered into merchant device 112, a manufacturer identifier corresponding to the manufacturer of the product, and/or any other item information that may be described herein.

In some implementations, merchant device 112 (e.g., the point of sale (POS) terminal device) can include redeemable codes processing module 116. In some implementations, the merchant identifier can identify the corresponding merchant redeemable code stored in the redeemable code database on user device 102. For example, the particular merchant redeemable code can be used only in the particular merchant location. In some implementations, redeemable codes processing module 116 can determine which "manufacture redeemable code" should be applied on the product identified by the manufacture identifier for a discount purchase price. For example, the particular manufacture redeemable code can be used at all stores.

Figure 4A:
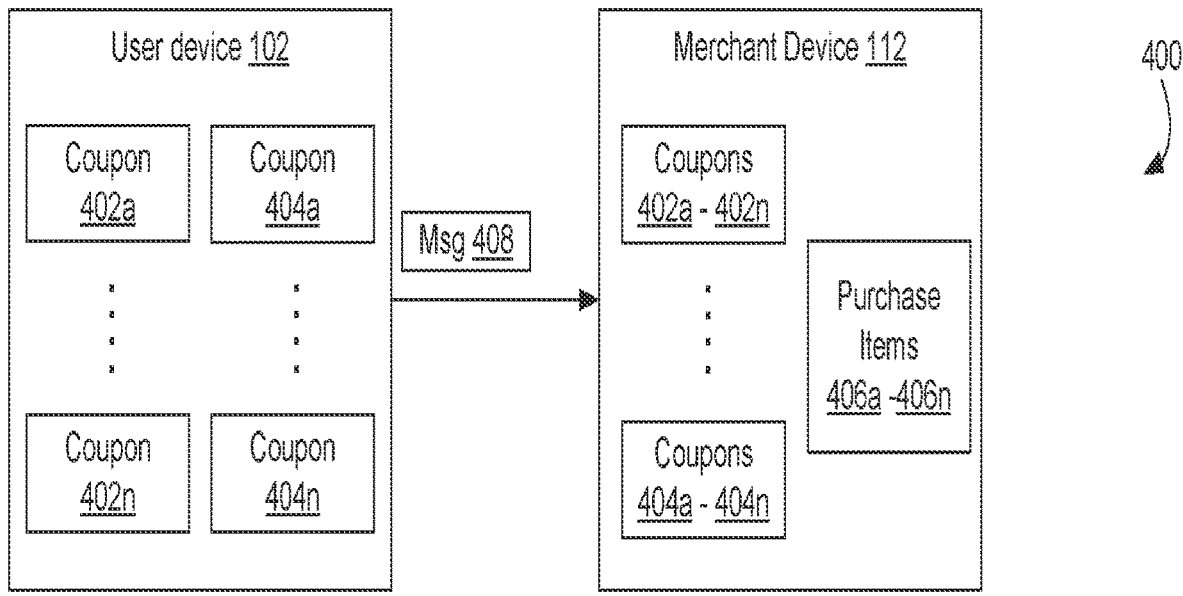
FIG. 4A is a block diagram of an example system for sending redeemable codes to the point of sale (POS) terminal device.
Figure 4B:
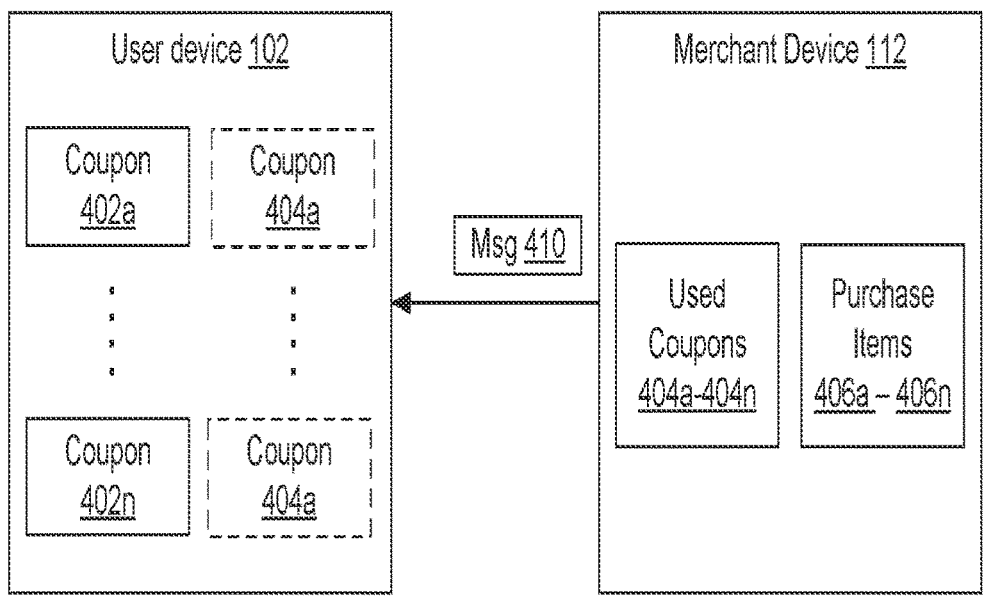
FIG. 4B is a block diagram of an example system for receiving used redeemable codes from the point of sale (POS) terminal device.

FIG. 4A is a block diagram of an example system 400 for sending redeemable codes (e.g., coupon 402a, 404a) from user device 102 to the point of sale (POS) terminal device 112. FIG. 4B is a block diagram of an example system for receiving used redeemable codes (e.g., coupons 404a-404n) from the point of sale (POS) terminal device 112 to user device 102.

For example, user device 102 may send all redeemable codes (e.g., coupons 402a-402n, 404a-404n) on the user device 112 to merchant device 112. In some implementations, merchant device 112 may only use the portion of redeemable codes 404a-404n matching the selected purchase items 406a-406n in the transaction.

In particular, FIG. 4A-4B illustrate a method of performing redeemable codes transactions over a short range communication interface according to some embodiments of the present technology. In some implementations, merchant device 112 may receive selected product information and send a signal requesting redeemable codes.

In some implementations, user device 102 can receive the request signal from merchant device 112. For example, the request signal may include merchant identifier. In some implementations, user device 102 can only receive the request signal when it is within the range of merchant device 112. Thus, in some implementations, the user may move user device 102 near merchant device 112 to receive the signal and initiate a transaction.

In some implementations, in response to the request signal, user device 102 may automatically send message 408 including all redeemable codes 402a-402n, 404a-404n on user device 102 to merchant device 112. In some implementations, merchant device 102 may only use the portion of those redeemable codes 404a-404n matching the selected purchase items 408a-408n in the transaction. In some implementations, merchant device 102 may send a used code notification 410 to user device 102. In some implementations, used code notification 410 can include redeemable codes 404a-404b used by merchant device 102 in the transaction. In some implementations, in response to used code notification 410, user device 102 can automatically remove used redeemable codes 404a-404n from user device 102. In some implementations, user device 102 can maintain unused redeemable codes 402a-402n on the user device 102 based on the used code notification 410. Alternatively, in some implementations, in response to the request signal, user device 102 may automatically determine relevant redeemable codes (e.g., 404a-404n). In some implementations, user device 102 can send only those relevant redeemable codes to merchant device 112.

In some implementations, user device 102 may automatically send redeemable codes information to merchant device 112. In some implementations, upon receiving the redeemable codes, merchant device 112 may automatically process redeemable codes information to apply discounts. In some implementations, merchant device 112 can send a discounted price and identifiers for used redeemable codes to user device 102. In some implementations, user device 102 can receive the discounted price and code identifiers and prompt user to make the payment. In some implementations, user device 102 can only receive the signal when it is within the range of merchant device 112. Thus, the user may move user device 102 near merchant device 112 to receive the signal. In some implementations, the user may provide authentication credentials (e.g., biometric data, fingerprint). For example, when credentials are validated, user device 102 can send payment account information to merchant device 112. In some implementations, user device 102 can delete used redeemable codes. In some implementations, merchant device 112 can receive payment information and process the payment for the discounted purchase price.

For example, the process described above may begin with initiating a redeemable code transaction by initiating a short range communication session between user device 102 and merchant device 112. For example, by bringing user device 102 within electronic communication range of merchant device 112, user device 102 can initiate redeemable codes transactions and payment transactions to exchange the device information, information about the merchant, and redeemable codes information.

In some implementations, bringing the user device 102 within communication range includes moving the user device 102 within a physical proximity such that electronic communications over a short range communications channel, such as NFC, can be established. In some implementations, bringing the user device 102 within communication range involves tapping user device 102 on merchant device 112. In some implementations, bringing user device 102 within communication range of merchant device involves a close proximity, but does not require contact by the devices. For example, at the time the user is purchasing items at a retail location, user device 102 can be authenticated and all the relevant unexpired redeemable codes on user device 102 can be transmitted to merchant device 112. Therefore, user device 102 may be able to reduce the number of redeemable codes transmitted by, for example, applying some rules such as store-specific or expiring soon, or selecting particular redeemable codes to transmit.

In some implementations, upon receiving the redeemable codes from the user device 102, redeemable code processing module 116 can send the redeemable codes to redeemable code processing server 124. In some implementations, redeemable code processing server 124 can calculate and adjust the cost of shopping products and send the result of final discounted payment information back to redeemable code processing module 116. In some implementations, redeemable code processing module 116 can then send the result of final discounted payment information, redeemable code identifier, product identifier, merchant identifier and/or other descriptive information to user device 102.

Figure 5:
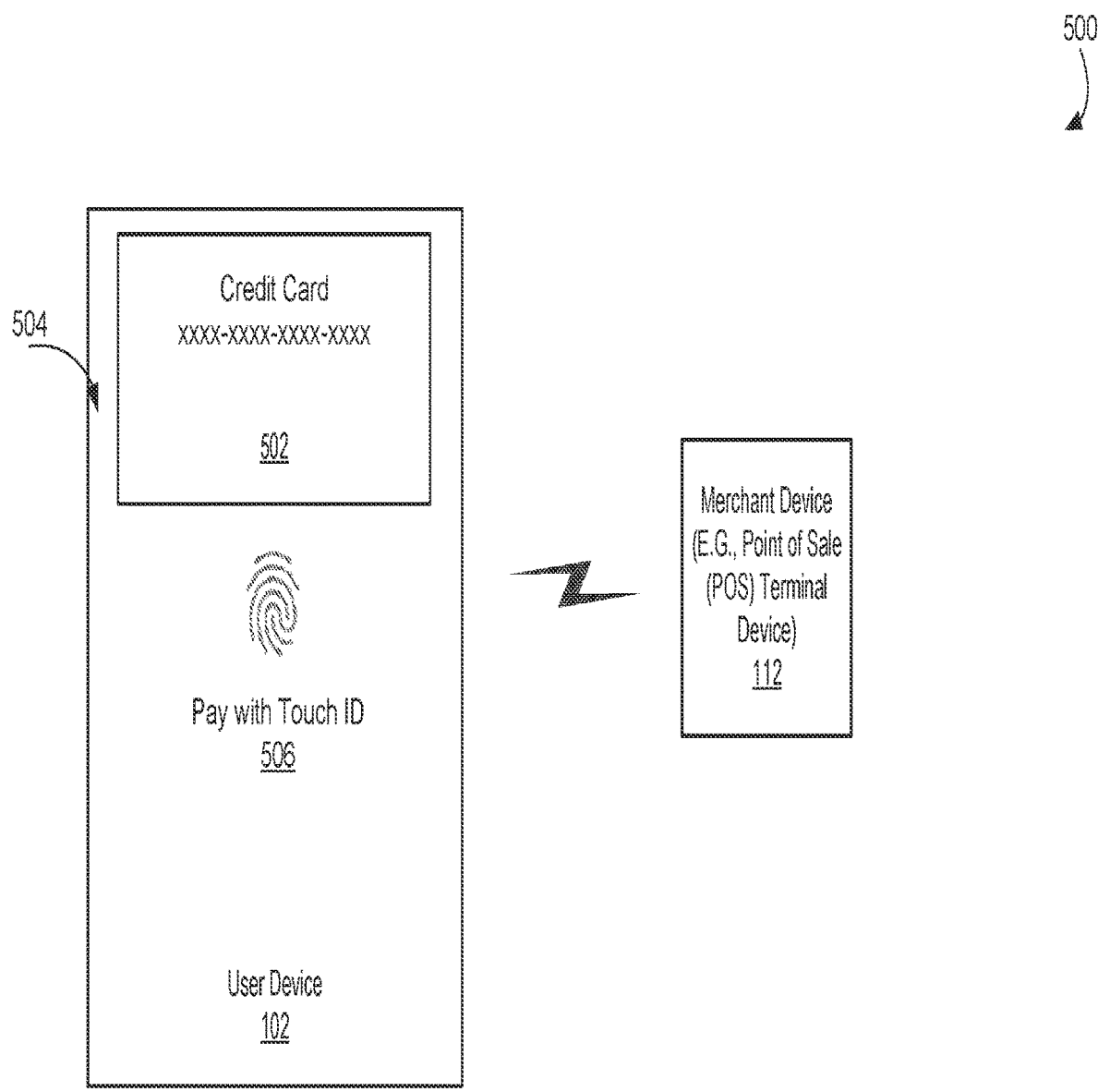
FIG. 5 illustrates an example graphical user interface for the user to use the default credit card as a default payment option.

FIG. 5 illustrates an example graphical user interface (i.e., payment options screen 504) for the user to use the default credit card (e.g., 502) as a default payment option that the user can change. To facilitate the following discussion regarding the operation of user device 102 in conducting a purchase transaction with merchant device 112, reference is made to drawings which may be representative of possible screen shots of user device 102 during the transaction. The functionality described may be achieved with a wide variety of graphical elements and visual schemes. Therefore, the present embodiments are not intended to be limited to the precise user interface conventions adopted herein. Rather, embodiments may include a wide variety of user interface styles. Indeed, the presently disclosed user interface conventions are based on Apple's iPhone for the convenience of the reader, although other user interface conventions could readily be used to carry out the present techniques.

In some implementations, merchant device 112 can send payment data to user device 102 from payment processing module 118. In some implementations, the payment data includes a discounted purchase price. In some implementations, the payment data includes used coupon identifiers. In some implementations, upon receiving the payment data by user device 102, user device 102 can present payment options screen 504 to the user. For example, payment options screen 504 may present default credit card 502. For example, user device 102 may determine default credit card 502 based on one or more previous transactions. In some implementations, the user can provide input to change default credit card 502 and select a different card. For example, payment options screen 504 may include a default credit card 502 and a prioritized credit card listing of possible payment options that have been stored on user device 102.

For example, from payment options screen 504, the user may authorize payment using a default or selected payment option (e.g., credit card 502) by providing biometric input 506. For example, biometric input 506 can be a scan of a fingerprint, an image of the user's face, a retinal scan, or other type of biometric input. User device 102 can authenticate the user based on biometric input 506 and initiate payment of the discounted price of the selected items when the user has been authenticated. For example, user device 102 can then send the payment data including the above user payment selection to the merchant device 112 over, for example, the short range communication interface.

Figure 6:
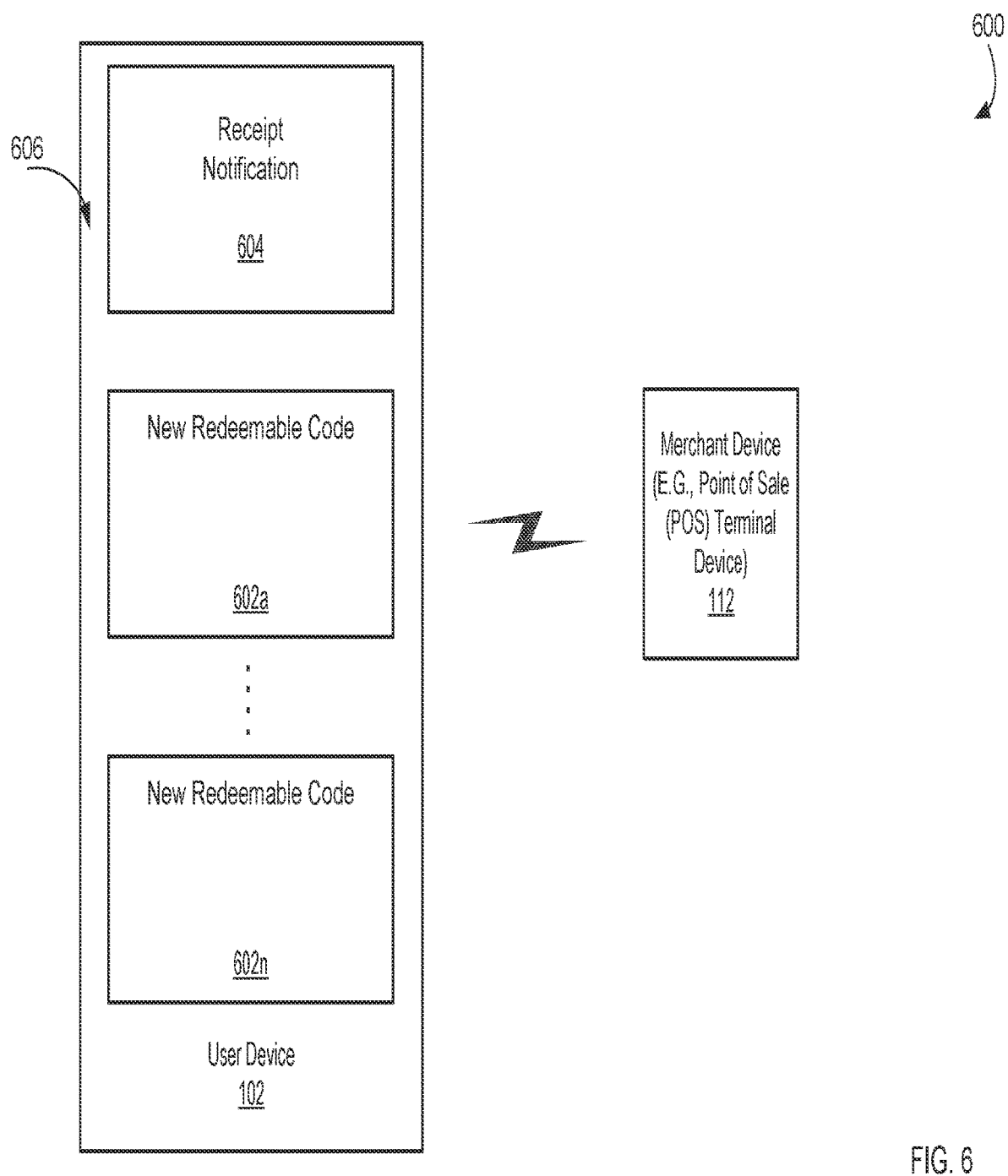
FIG. 6 illustrates an example graphical user interface presenting the receipt notification.

FIG. 6 illustrates an example graphical user interface 600 presenting receipt notification 604. For example, user device 102 may receive receipt notification 604 indicating that payment was processed. In some implementations, user may select receipt notification 604 to view the receipt which includes detail of the transaction. For example, the receipt may provide the final discounted purchase amount, used redeemable codes, the transaction date and so on.

In some implementations, upon receiving the payment data from user device 102, merchant device 112 may obtain new redeemable codes 602a-602n from a merchant server based on products the user purchased. For example, new redeemable codes may be created by a product manufacture. For example, new redeemable codes may be created by a merchant. In some implementations, upon receiving the payment data from user device 102, merchant device 112 may obtain new redeemable codes 602a-602n from redeemable code processing server 124 based on products the user purchased. In some implementations, merchant device 112 can then send new redeemable codes 602a-602n to user device 102. In some implementations, merchant device 112 can send receipt notification 604 to user device 102.

For example, from the payment options screen 504 (FIG. 5), the user may select a default payment option or the user may provide input to select other payment options. In some implementations, user device 102 can store new redeemable codes options 602a-602n sent from merchant device 112.

For example, upon receiving new redeemable codes 602a-602n from merchant device 112, user device 102 can store them on user device 102. In some implementations, similar as above, graphical user interface 606 can present the graphical notification of payment confirmation 604 on user device 102 to the user. For example, graphical user interface (GUI) 606 can be a home screen, navigational menu, or application selection user interface. For example, graphical element 604 can be an image, icon, or other graphical objects for a user to select to review the receipt.

Example Processes

Figure 7:
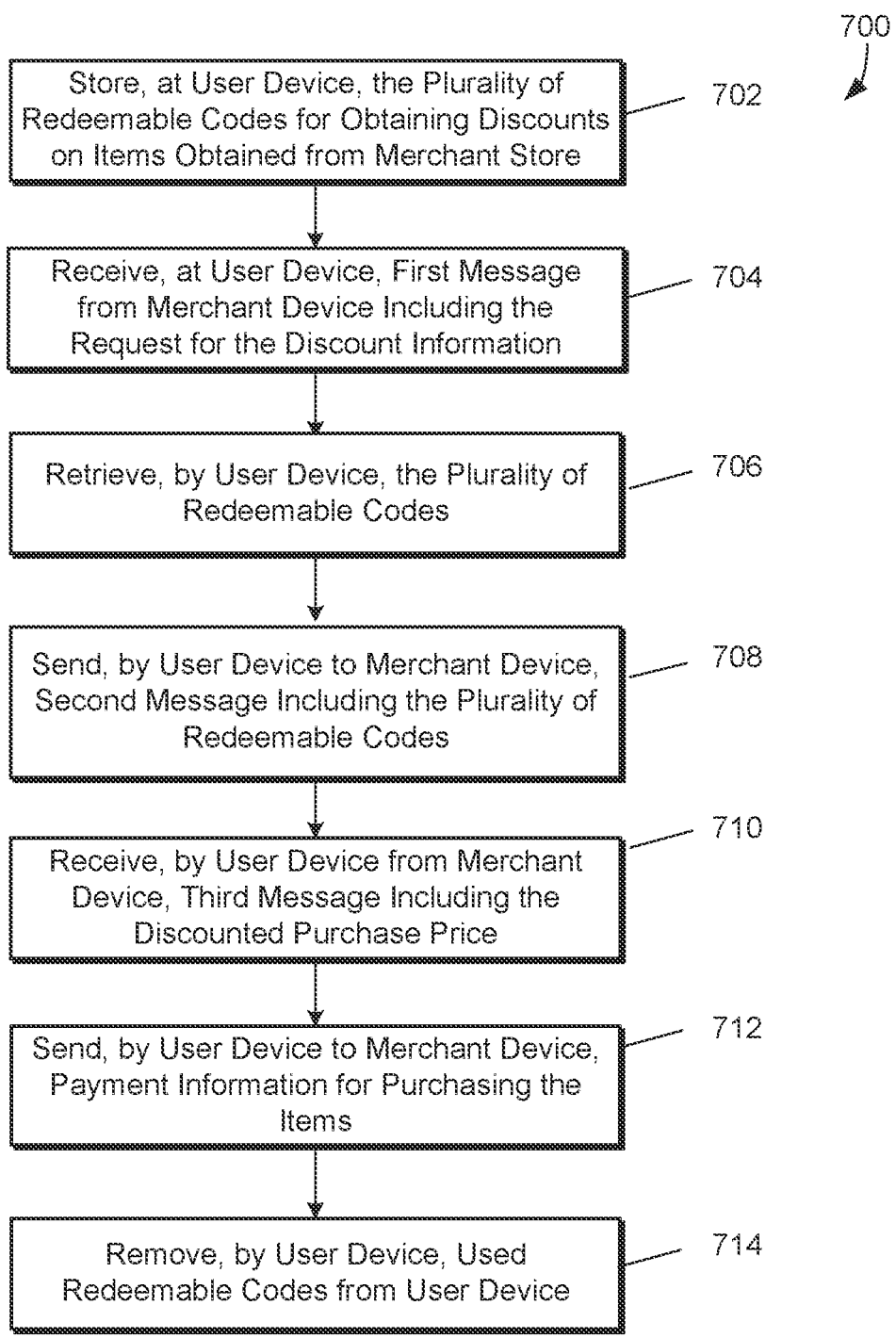
FIG. 7 is a flow diagram of an example process for redeeming multiple redeemable codes in a single transaction.

FIG. 7 is a flow diagram of an example process 700 for redeeming multiple redeemable codes in a single transaction. For example, a user device can implement process 700 to redeem multiple redeemable codes in a single transaction.

At step 702, user device 102a can store the plurality of redeemable codes. For example, redeemable codes can be used to obtain discounts on the items obtained or purchased from a merchant store. In some implementations, user device 102 may include a scanner and the scanner may be used to obtain the redeemable code associated with product identifying information from a bar code, a QR code, or the like. User device 102 may also include a camera and the camera may be used to identify the redeemable code associated with certain consumer products. One of the ordinary skill in the art will recognize various devices and techniques for implementing the bar code scanner within user device 102. For example, user device 102 may include a camera. In some implementations, the camera may be used to capture an image of a bar code, or other things, which may then be processed by user device 102 to extract the encoded product-identifying information associated with the corresponding redeemable code. Techniques for processing a video image to extract coded information will also be known by those of ordinary skill in the art. In some implementations, user device 102 may further include a near field communication (NFC) interface. For example, the NFC interface may identify and allow for close range communication at relatively low data rates (424 kb/s), or it may allow for close range communication at relatively high data rates (560 Mbps). The close range communication with the NFC interface may take place through magnetic field induction, allowing the NFC interface to communicate with other NFC devices such as radio frequency identification (RFID) tags, for example. In some implementations, the NFC interface may be used to identify a redeemable code associated with a product that contains an NFC compatible device such as an RFID tag. Therefore, user device 102 can store the plurality of redeemable codes obtained from different ways addressed above for obtaining discounts on the items obtained from the merchant store.

At step 704, user device 102 can receive a request for discount information from merchant device 112. For example, merchant device 112 can correspond to point-of-sale system (POS) terminal device. In some implementations, upon receiving the shopping products information, merchant device 112 can send a request for discount information to user device 102. For example, user device 102 can receive the request including shopping products information that includes product identifiers of scanned shopping products 306a-306n and an identifier for the merchant that provided redeemable codes. As described above, the product identifier can identify the corresponding product redeemable code stored in the redeemable code database on user device 102. In some implementations, the merchant identifier can identify the corresponding merchant redeemable code stored in the redeemable code database on user device 102. For example, redeemable codes processing module 116 can determine which "product redeemable code" should be applied on the product identified by the product identifier for a discount purchase price. In some implementations, redeemable codes processing module 116 can determine which "merchant redeemable code" should be applied on the product identified by the merchant identifier for a discount purchase price.

At step 706, user device 102 can select the plurality of redeemable codes to merchant device 112 for the current transaction. In some implementations, user device 102 may send all redeemable codes (e.g., coupons 402a-402n, 404a-404n) on the user device 112 to merchant device 112. In some implementations, merchant device 112 may only use the portion of redeemable codes 404a-404n matching the selected purchase items 406a-406n in the transaction.

In some implementations, alternatively, upon receiving the request for discount information that includes the merchant identifier from merchant device 112, user device 102 can use the merchant identifier to identify the corresponding merchant redeemable code stored in the redeemable code database on user device 102.

At step 708, user device 102 can send one or more redeemable codes to merchant device 112. For example, user device 102 may send all redeemable codes (e.g., coupons 402a-402n, 404a-404n) on the user device 112 to merchant device 112. In some implementations, merchant device 112 may only use the portion of redeemable codes 404a-404n matching the selected purchase items 406a-406n in the transaction. For example, merchant device 102 may only use the portion of those redeemable codes 404a-404n matching the selected purchase items 408a-408n in the transaction. In some implementations, merchant device 102 may send a used code notification 410 to user device 102. In some implementations, used code notification 410 can include redeemable codes 404a-404b used by merchant device 102 in the transaction. In some implementations, in response to used code notification 410, user device 102 can automatically remove used redeemable codes 404a-404n from user device 102. In some implementations, user device 102 can maintain unused redeemable codes 402a-402n on the user device 102 based on the used code notification 410.

In some implementations, alternatively, user device 102 can send the plurality of redeemable codes which are available on user device 102 to merchant device 112 based on the identifier for the merchant. In some implementations, user device 102 can send redeemable codes' metadata that describes the discount amount and/or the expiration date of the redeemable codes to the merchant server. In some implementations, user device 102 can send redeemable codes' metadata that describes the discount amount and/or the expiration date of the redeemable codes to redeemable code processing server 124. For example, redeemable code processing server 124 may apply the redeemable codes which will expire first, or apply the redeemable code which has the largest discount amount first. Similarly, the merchant server may apply the redeemable codes which will expire first, or apply the redeemable code which has the largest discount amount first. In some implementations, user device 102 can send one or more redeemable codes along with the metadata to merchant device 112.

At step 710, user device 102 can receive a payment request from merchant device 112. In some implementations, merchant device 112 may generate a payment request based on the final payment discounted purchase price and used redeemable codes 404a-404n sent by redeemable codes processing server 124. Similarly, in some implementations, merchant device 112 may generate a payment request based on the final payment discounted purchase price and used redeemable codes 404a-404n sent by the merchant server. For example, the payment request can include a discounted purchase price for the items purchased 406a-406n by the user. For example, the discounted purchase price can be the price of the selected items (e.g., 406a-406n) after relevant discounts (e.g., redeemable codes 404a-404n) are applied to the original price of the selected items. The payment request can include identifiers for each of the plurality of redeemable codes used for generating the discounted purchase price. For example, merchant device 112 can send the redeemable codes to redeemable code processing server 124 through network 122 to evaluate the validity and priority of the redeemable codes and then decide the discounted purchase price based on the evaluation.

At step 712, user device 102 can send the payment data for purchasing the items to merchant device 112. For example, in response to receiving the payment request at step 710, user device 102 can present a payment prompt on a display of user device 102. When the user authorizes payment of the discounted purchase price (e.g., through biometric input, by providing credentials, etc.), user device 102 can send payment data to merchant device 112 so that the payment for the selected items can be processed. As described above, the payment data can include, for example, the default credit card information, discounted purchase price, used redeemable codes identifiers and so on.

At step 714, user device 102 can remove the used redeemable codes from user device 102. As described above, in some implementations, user device 102 may send all redeemable codes 402a-402n, 404a-404n on user device 102 to merchant device 112. In some implementations, merchant device 102 may only use the portion of those redeemable codes 404a-404n matching the selected purchase items 408a-408n in the transaction. In some implementations, merchant device 102 may send a used code notification 410 to user device 102. In some implementations, used code notification 410 can include redeemable codes 404a-404b used by merchant device 102 in the transaction. In some implementations, in response to used code notification 410, user device 102 can automatically remove used redeemable codes 404a-404n from user device 102. In some implementations, user device 102 can maintain unused redeemable codes 402a-402n on the user device 102 based on the used code notification 410.

In some implementations, user device 102 can determine based on the redeemable code identifiers received at step 710 which redeemable codes stored on user device 102 were used to generate the discounted price above. For example, user device 102 can compare the used redeemable code identifiers received at step 710 to the redeemable code identifiers associated with the redeemable codes stored on user device 102 to determine which redeemable codes were used. After determining which redeemable codes were used to generate the discounted price, user device 102 can remove or delete the used redeemable codes from storage on user device 102.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Example System Architecture

Figure 8:
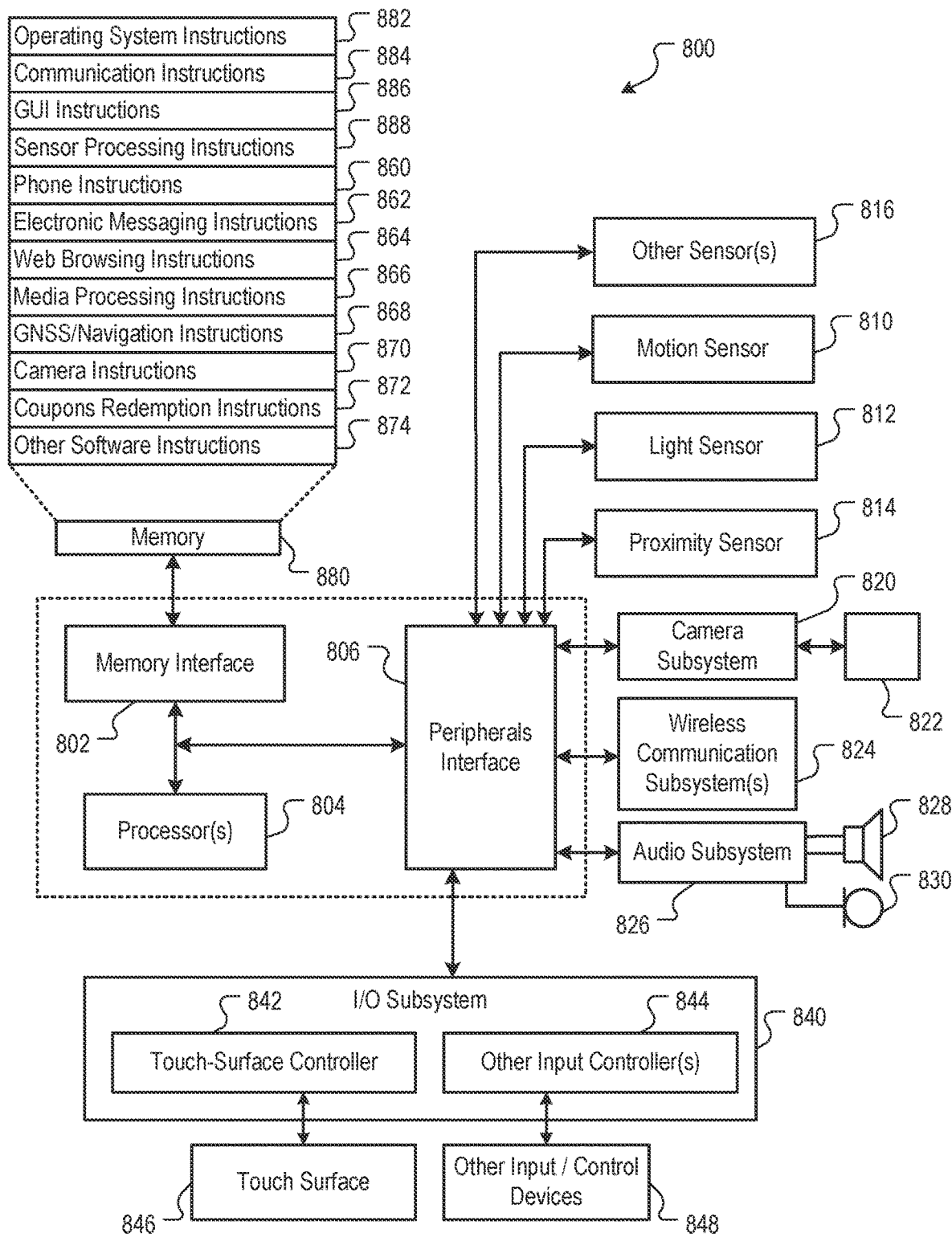
FIG. 8 is a block diagram of an example system architecture implementing the features and processes of FIGS. 1-7.

FIG. 8 is a block diagram of an example computing device 800 that can implement the features and processes of FIGS. 1-7. The computing device 800 can include a memory interface 802, one or more data processors, image processors and/or central processing units 804, and a peripherals interface 806. The memory interface 802, the one or more processors 804 and/or the peripherals interface 806 can be separate components or can be integrated in one or more integrated circuits. The various components in the computing device 800 can be coupled by one or more communication buses or signal lines.

Sensors, devices, and subsystems can be coupled to the peripherals interface 806 to facilitate multiple functionalities. For example, a motion sensor 810, a light sensor 812, and a proximity sensor 814 can be coupled to the peripherals interface 806 to facilitate orientation, lighting, and proximity functions. Other sensors 816 can also be connected to the peripherals interface 806, such as a global navigation satellite system (GNSS) (e.g., GPS receiver), a temperature sensor, a biometric sensor, magnetometer or other sensing device, to facilitate related functionalities.

A camera subsystem 820 and an optical sensor 822, e.g., a charged coupled device (CCD) or a complementary metal-oxide semiconductor (CMOS) optical sensor, can be utilized to facilitate camera functions, such as recording photographs and video clips. The camera subsystem 820 and the optical sensor 822 can be used to collect images of a user to be used during authentication of a user, e.g., by performing facial recognition analysis.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which the computing device 800 is intended to operate. For example, the computing device 800 can include communication subsystems 824 designed to operate over a GSM network, a GPRS network, an EDGE network, a Wi-Fi or WiMax network, and a Bluetooth™ network. In particular, the wireless communication subsystems 824 can include hosting protocols such that the device 100 can be configured as a base station for other wireless devices.

An audio subsystem 826 can be coupled to a speaker 828 and a microphone 830 to facilitate voice-enabled functions, such as speaker recognition, voice replication, digital recording, and telephony functions. The audio subsystem 826 can be configured to facilitate processing voice commands, voiceprinting and voice authentication, for example.

The I/O subsystem 840 can include a touch-surface controller 842 and/or other input controller(s) 844. The touch-surface controller 842 can be coupled to a touch surface 846. The touch surface 846 and touch-surface controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 846.

The other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of the speaker 828 and/or the microphone 830.

In one implementation, a pressing of the button for a first duration can disengage a lock of the touch surface 846; and a pressing of the button for a second duration that is longer than the first duration can turn power to the computing device 800 on or off. Pressing the button for a third duration can activate a voice control, or voice command, module that enables the user to speak commands into the microphone 830 to cause the device to execute the spoken command. The user can customize a functionality of one or more of the buttons. The touch surface 846 can, for example, also be used to implement virtual or soft buttons and/or a keyboard.

In some implementations, the computing device 800 can present recorded audio and/or video files, such as MP3, AAC, and MPEG files. In some implementations, the computing device 800 can include the functionality of an MP3 player, such as an iPod™. The computing device 800 can, therefore, include a 36-pin connector that is compatible with the iPod. Other input/output and control devices can also be used.

The memory interface 802 can be coupled to memory 850. The memory 850 can include high-speed random access memory and/or non-volatile memory, such as one or more magnetic disk storage devices, one or more optical storage devices, and/or flash memory (e.g., NAND, NOR). The memory 850 can store an operating system 852, such as Darwin, RTXC, LINUX, UNIX, OS X, WINDOWS, or an embedded operating system such as VxWorks.

The operating system 852 can include instructions for handling basic system services and for performing hardware dependent tasks. In some implementations, the operating system 852 can be a kernel (e.g., UNIX kernel). In some implementations, the operating system 852 can include instructions for performing voice authentication. For example, operating system 852 can implement the redeeming multiple redeemable codes in a single transaction as described with reference to FIGS. 1-7.

The memory 850 can also store communication instructions 854 to facilitate communicating with one or more additional devices, one or more computers and/or one or more servers. The memory 850 can include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GNSS/Navigation instructions 868 to facilitate GNSS and navigation-related processes and instructions; and/or camera instructions 870 to facilitate camera-related processes and functions.

The memory 850 can store other software instructions 872 to facilitate other processes and functions, such as the redeeming multiple redeemable codes in a single transaction processes and functions as described with reference to FIGS. 1-7.

The memory 850 can also store other software instructions 874, such as web video instructions to facilitate web video-related processes and functions; and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively.

Although not depicted, device 800 can include provision of electricity via a battery, solar cells for providing electricity, motion-to-electricity converters, and/or AC/DC conversion.

Each of the above identified instructions and applications can correspond to a set of instructions for performing one or more functions described above. These instructions need not be implemented as separate software programs, procedures, or modules. The memory 850 can include additional instructions or fewer instructions. Furthermore, various functions of the computing device 800 can be implemented in hardware and/or in software, including in one or more signal processing and/or application specific integrated circuits.

What is claimed is:

1. A method comprising:
   storing, at a mobile device, a plurality of codes, the plurality of codes being obtained from a plurality of merchants;
   receiving, at the mobile device, a first message from a merchant device related with a particular merchant from the plurality of merchants, the first message including an identifier for the particular merchant;
   in response to receiving the first message, retrieving, by the mobile device without user interaction and based on the identifier for the particular merchant, one or more codes applicable to the particular merchant;
   sending, by the mobile device to the merchant device without user interaction, a second message including the one or more codes for items selected from the merchant; and
   removing, by the mobile device, each of the one or more codes from the mobile device responsive to sending the one or more codes to the merchant device.

2. The method as recited in claim 1, further comprising receiving, by the mobile device from the merchant device, a third message including:
   a discounted purchase price for the items selected by a user of the mobile device; and
   identifiers for each of the one or more codes used to generate the discounted purchase price.

3. The method as recited in claim 2, further comprising sending, by the mobile device to the merchant device, payment information for purchasing the items selected from the merchant.

4. The method as recited in claim 2, wherein the third message includes a plurality of new codes based on the items selected by the user, the method further comprising storing the plurality of new codes at the mobile device.

5. The method as recited in claim 2, further comprising removing from the mobile device each of the one or more codes used to generate the discounted purchase price based on a comparison of the identifiers for each of the one or more codes to identifiers for the plurality of codes stored to the mobile device to determine which redeemable codes to remove.

6. The method as recited in claim 1, further comprising filtering the plurality of codes based on the identifier.

7. The method as recited in claim 1, wherein the first message is received at the mobile device in response to the mobile device being positioned within a threshold distance of the merchant device.

8. A system comprising:
   one or more processors; and
   a non-transitory computer-readable medium including one or more sequences of instructions that, when executed by the one or more processors, causes:

storing, at a mobile device, a plurality of codes, the plurality of codes being obtained from a plurality of merchants;

receiving, at the mobile device, a first message from a merchant device related with a particular merchant from the plurality of merchants, the first message including an identifier for the particular merchant;

in response to receiving the first message, retrieving, by the mobile device without user interaction and based on the identifier for the particular merchant, one or more codes applicable to the particular merchant;

sending, by the mobile device to the merchant device without user interaction, a second message including the one or more codes for items selected from the merchant; and removing, by the mobile device, each of the one or more codes from the mobile device responsive to sending the one or more codes to the merchant device.

9. The system as recited in claim 8, wherein the one or more sequences of instructions further cause receiving, by the mobile device from the merchant device, a third message including:

a discounted purchase price for the items selected by a user of the mobile device; and identifiers for each of the one or more codes used to generate the discounted purchase price.

10. The system as recited in claim 9, wherein the one or more sequences of instructions further cause sending, by the mobile device to the merchant device, payment information for purchasing the items selected from the merchant.

11. The system as recited in claim 9, wherein the third message includes a plurality of new codes based on the items selected by the user, and wherein the one or more sequences of instructions further cause storing the plurality of new codes at the mobile device.

12. The system as recited in claim 9, wherein the one or more sequences of instructions further cause removing from the mobile device each of the one or more codes used to generate the discounted purchase price based on a comparison of the identifiers for each of the one or more codes to identifiers for the plurality of codes stored to the mobile device to determine which redeemable codes to remove.

13. The system as recited in claim 8, wherein the one or more sequences of instructions further cause filtering the plurality of codes based on the identifier.

14. The system as recited in claim 8, wherein the first message is received at the mobile device in response to the mobile device being positioned within a threshold distance of the merchant device.

15. A non-transitory computer-readable medium including one or more sequences of instructions that, when executed by one or more processors, causes:

storing, at a mobile device, a plurality of codes, the plurality of codes being obtained from a plurality of merchants;

receiving, at the mobile device, a first message from a merchant device related with a particular merchant from the plurality of merchants, the first message including an identifier for the particular merchant;

in response to receiving the first message, retrieving, by the mobile device without user interaction and based on the identifier for the particular merchant, one or more codes applicable to the particular merchant;

sending, by the mobile device to the merchant device without user interaction, a second message including the one or more codes for items selected from the merchant; and removing, by the mobile device, each of the one or more codes from the mobile device responsive to sending the one or more codes to the merchant device.

16. The non-transitory computer-readable medium as recited in claim 15, wherein the one or more sequences of instructions further cause receiving, by the mobile device from the merchant device, a third message including:

a discounted purchase price for the items selected by a user of the mobile device; and identifiers for each of the one or more codes used to generate the discounted purchase price.

17. The non-transitory computer-readable medium as recited in claim 15, wherein the one or more sequences of instructions further cause filtering the plurality of codes based on the identifier, and wherein the first message is received at the mobile device in response to the mobile device being positioned within a threshold distance of the merchant device.

* * * * *